Aug. 31, 1943.   G. S. MacDONALD ET AL   2,328,284
OPTICAL INSTRUMENT
Filed Aug. 19, 1941   2 Sheets-Sheet 1
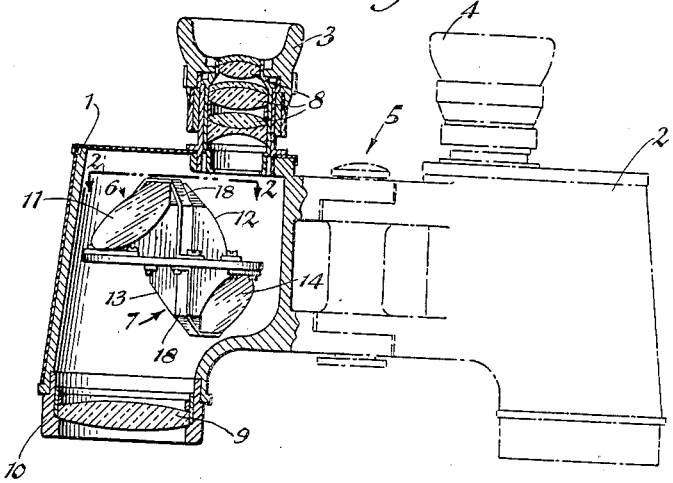
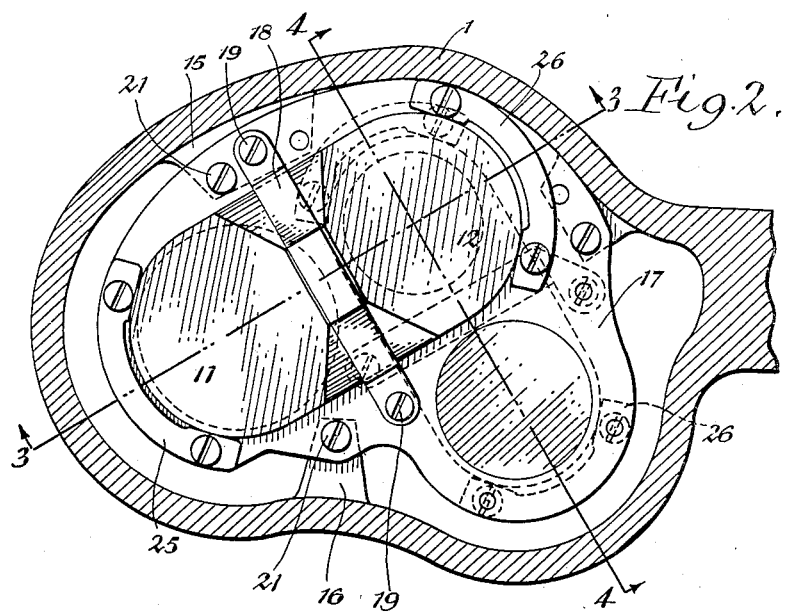
INVENTORS
GEORGE S. MACDONALD
JAMES E. TRAFTON
BY
Raymond A. Paquin
ATTORNEY Aug. 31, 1943.  G. S. MacDONALD ET AL  2,328,284
OPTICAL INSTRUMENT
Filed Aug. 19, 1941  2 Sheets-Sheet 2
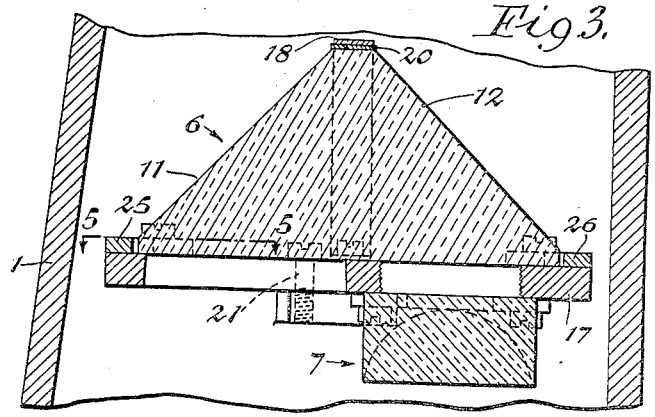
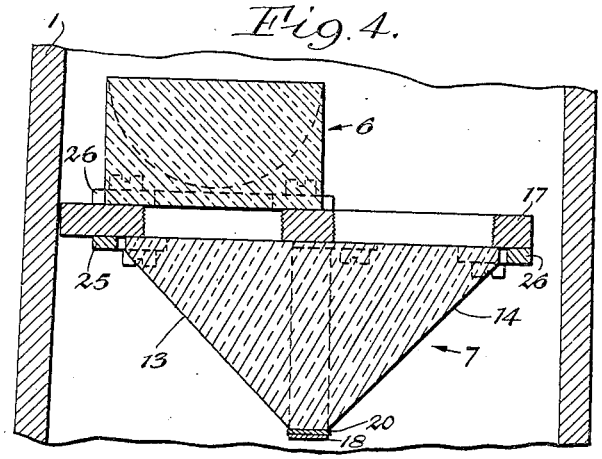
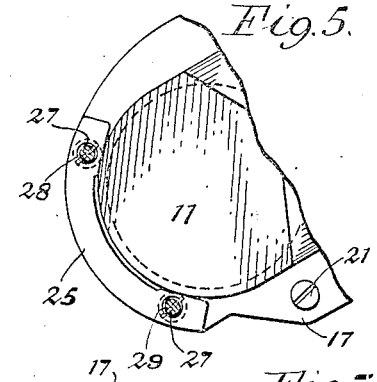
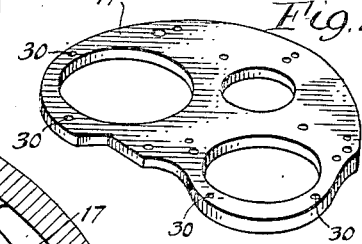
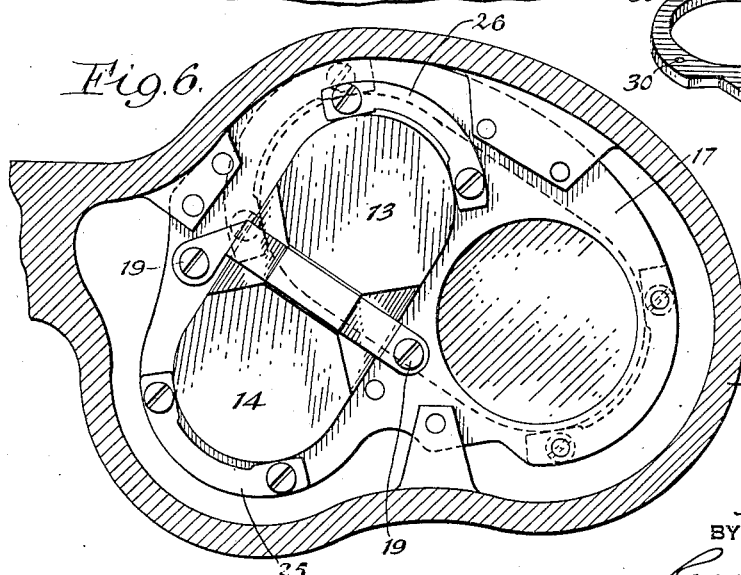
INVENTORS
GEORGE S. MACDONALD
JAMES E. TRAFTON
BY
Raymond A. Paquin
ATTORNEY Patented Aug. 31, 1943

2,328,284

UNITED STATES PATENT OFFICE 2,328,284

OPTICAL INSTRUMENT

George S. MacDonald, Buffalo, and James E. Trafton, Kenmore, N. Y., assignors to Spencer Lens Company, Buffalo, N. Y., a corporation of New York Application August 19, 1941, Serial No. 407,424

5 Claims. (Cl. 88—33)

This invention relates to optical instruments and has particular reference to a new and improved means for supporting the prismatic elements thereof which allows the adjustment of said prisms for alignment and then permits the permanent locking of said prisms in said adjusted position.

Another object of the invention is to provide new and improved means for supporting the prismatic elements in an optical system whereby said prismatic elements may be adjusted for alignment and then secured in said adjusted position.

Another object of the invention is to provide means of the type set forth which will allow adjustment of the prism in practically any desired direction.

Another object of the invention is to provide a supporting plate for a prism and adjustable means for securing said prism on said plate in adjusted position.

Another object of the invention is to provide simple, efficient and economical means for supporting the prismatic element of an optical system whereby said prismatic elements may be adjusted for alignment and then permanently secured in said adjusted position.

Other objects and advantages of the invention will be apparent from the following description taken in connection with the accompanying drawings and it will be understood that many changes may be made in the details of construction and arrangement of parts without departing from the scope of the invention as expressed in the accompanying claims.

Referring to the drawings:

Fig. 1 is a plan view of a pair of binoculars embodying the invention and showing one of the telescopes thereof in section;

Fig. 2 is a sectional view, on an enlarged scale, taken on line 2—2 of Fig. 1, looking in the direction of the arrows;

Fig. 3 is a sectional view taken on line 3—3 of Fig. 2, looking in the direction of the arrows;

Fig. 4 is a sectional view taken on line 4—4 of Fig. 2, looking in the direction of the arrows;

Fig. 5 is a sectional view taken on line 5—5 of Fig. 3, looking in the direction of the arrows;

Fig. 6 is a bottom view, on an enlarged scale, of the prisms and holder in the right hand casing;

Fig. 7 is a perspective view of the prism holding plate; and

Fig. 8 is a perspective view of one of the prism adjusting members.

While the invention is shown applied to prism binoculars, it is apparent that the invention may be employed in any instrument embodying prismatic optical elements.

Many optical instruments employing prismatic optical elements require that said prismatic optical elements be properly aligned with each other and/or with the elements of the optical system. It is therefore necessary that such prismatic optical elements be adjustably retained in alignment with the other elements of the optical system to allow adjustment for proper alignment thereof after which the prismatic element is permanently secured in said adjusted aligned position.

Referring more particularly to the drawings wherein corresponding parts are designated by corresponding reference characters throughout the several views, the prism binocular shown embodying the invention comprises a pair of casings 1 and 2, and an eyepiece 3 and 4 on each of said casings 1 and 2.

The said casings 1 and 2 pivotally connected by the hinge member 5 to allow adjustment of said eyepieces 3 and 4 to the correct interpupillary distance for the particular user. Each of said casings contains the pair of Porro prisms 6 and 7.

Each of the eyepieces 3 and 4 contain the lens system 8 adapted to be in optical alignment with the prisms 6 and 7 and the objective lens 9 secured in the cap 10 to the side of the casing opposite the eyepiece.

Light entering each of the telescopes of the binocular passes through the objective lens 9 and enters the prism 6 and is reflected by the surface 11 of the said prism 6 to the surface 12 of said prism 6 which in turn reflects said light into the prism 7 where it is reflected by the surface 13 to the surface 14 of said prism 7 where it is in turn reflected into the lens system 8 of said eyepiece and passes through said lens system 8 into the eye of the observer.

It will be seen from the above that it is necessary that the prisms 6 and 7 be in correct alignment with each other as well as with the other elements of the optical system.

The casings 1 and 2 each have the integral internal flanges or supports 15 and 16 on which supports are secured the prism plates or holders 17 on each of which are secured a pair of prisms 6 and 7. The said prisms 6 and 7 are retained on said plate or holder 17 by means of the straps 18 which are secured at their opposite ends to said plate 17 by screws 19 or other suitable means. Between the upper portion of said prisms 6 and 7 and said straps 18 is placed a strip 20 of cork or other resilient material to prevent strain being set up in said prisms 6 and 7.

The plates or holders 17 are retained in position in the casings 1 and 2 on the flanges 15 and 16 by the screws 21 or other suitable means.

The plate 17 is provided with the three openings 22, 23 and 24 to permit light entering through the objective to pass through the opening 22 and enter the prism and then pass through the opening 23 to enter the prism 7 and then through the opening 24 to enter the eyepiece as described above.

At the opposite extremities of each of the prisms 6 and 7 are positioned the adjusting members 25 and 26. The adjusting members 25 and 26 for the prisms 6 and 7 are identical except that the pair for the prism 7 are necessarily smaller than those for the prism 6 due to the fact that the prism 7 is smaller in size than said prism 6.

Each of said adjusting members 25 and 26 is provided with the prism engaging projections 32 and 33 adapted to engage the outer edge of the prism to retain said prism in adjusted position.

The said prism adjusting members 25 and 26 are adjustably secured to said plate 17 by means of screws or the like 27 which pass through the openings 28 and 29 in said prism adjusting members and threadedly engage the openings 30 in the plate 17.

It is pointed out that the prism adjusting members 25 and 26 are each provided with projecting portions 32 and 33 adjacent the opposite ends thereof. These projecting portions are adapted to engage the edge of the prism to retain the said prism in adjusted position as hereinafter described.

It is also pointed out that the openings 28 and 29 in the prism adjusting members 25 and 26 are formed larger in diameter than the diameter of the bore of the screws 27 which pass through said openings 28 and 29 and threadedly engage the threaded openings 30 in the plate 17. Because of the said openings 28 and 29 being larger than said screws 27, it is possible to loosen the said screws 27 and then align the prisms 6 and 7 and then move the adjusting members 25 and/or 26 until they engage the edges of said prism and then tighten the screws 27 to permanently retain the prism in adjusted aligned relation.

It will be apparent that in some cases it will be necessary to provide said adjusting members 25 and 26 for only one of said prisms 6 or 7 as that will allow sufficient adjustment necessary to properly align the said prisms and in such cases the other of said prisms 6 or 7 may be secured in permanent position on said plate 17. However where it is desired to provide a wider range of adjustment both of said prisms 6 and 7 may be adjustably secured as shown in the drawings.

Also, where only a limited range of adjustment is necessary, only one of the adjusting members may be used and the other end of the prism engaging a fixed stop on the prism plate.

It will be noted that by employing the adjusting members 25 and 26 as herein set forth that practically universal adjustment of the prism members is possible which allows proper alignment of the prisms. In using the said prism adjusting members the prism plate 17 is first secured in the casing by the screws or the like 21 as heretofore described and then the prisms 6 and 7 aligned by adjusting the adjusting members 25 and 26 and this insures that the prisms are properly aligned for the particular instrument in which they are used.

It is further pointed out that while the adjusting members have been shown for aligning a prism with another prism that the adjusting members may also be similarly employed for aligning a prism with other optical elements.

From the foregoing it will be seen that we have provided simple, efficient and economical means for carrying out and obtaining all of the objects and advantages of the invention.

Having described our invention we claim:

1. In a device of the character described, a support, means for retaining a prism on said support while allowing pivotal adjustment of said prism, adjustable members on said support adapted to engage said prism to retain the same in adjusted pivotal position, openings in said adjustable members, threaded means extending through said openings in said adjustable members and threaded into said support, the openings in said adjustable members being considerably larger than the diameter of said threaded means to allow adjustment of said adjustable members whereby said adjustable members will engage said prism and when said threaded means are tightened, retain said prism in adjusted pivoted position.

2. In a device of the character described, a support, means for retaining a prism on said support while allowing pivotal adjustment thereof, adjustable members on said support, said adjustable members having projections adapted to engage the periphery of said prism adjacent opposite sides thereof to retain the same in adjusted pivoted position, openings in said adjustable members, threaded means extending through said openings in said adjustable members and threaded into said support, the openings in said adjustable members being considerably larger than the diameter of said threaded means to allow adjustment of said adjustable members about said threaded means whereby said adjustable members will engage said prism and when said threaded means are tightened, retain said prism in adjusted pivoted position.

3. In a device of the character described, a support, means for retaining a prism on said support while allowing pivotal adjustment of said prism, adjustable means on said support having spaced bearing points to engage spaced portions of the periphery of said prism to retain the same in adjusted pivotal position, spaced openings in said adjustable means, means extending through said openings in said adjustable means and into said support, the openings in said adjustable means being larger than the diameter of the portion of said means fitting in said openings to allow adjustment of said adjustable means whereby said spaced bearing points on said adjustable means will engage said spaced portions of the periphery of said prism and when said means are tightened, retain said prism in adjusted pivotal position.

4. In a device of the character described, a support, means for retaining a prism on said support while allowing pivotal adjustment thereof, adjustable means on said support, said adjustable means having projecting portions adapted to engage the periphery of said prism at spaced points to retain said prism in adjusted pivoted position, openings in said adjustable means, threaded means extending through said openings in said adjustable means and threaded into said support, the openings in said adjustable means being larger than the diameter of the portion of said threaded means fitting in said openings to allow adjustment of said adjustable means about said threaded means whereby said projecting portions on said adjustable means will engage said prism and when said threaded means are tightened, retain said prism in adjusted pivoted position.

5. In a device of the character described, a support, means for retaining a prism on said support while allowing pivotal adjustment of said prism, adjustable means on said support having spaced bearing portions to engage spaced portions of the periphery of said prism adjacent the opposed ends thereof to retain the prism in adjusted pivoted position, spaced openings in said adjustable means, means extending through said openings in said adjustable means and into said support, the openings in said adjustable means being larger than the diameter of the portion of said means fitting in said openings to allow adjustment of said adjustable means whereby said adjustable means may be adjusted with said spaced bearing portions engaging portions of the opposed ends of said prism when said prism is in adjusted position and when said means are tightened will retain said prism in said adjusted pivoted position.

GEORGE S. MacDONALD.
JAMES E. TRAFTON.